United States Patent
Munoz Delgado

(10) Patent No.: US 12,046,024 B2
(45) Date of Patent: Jul. 23, 2024

(54) DETERMINATION OF THE DECISION-RELEVANT IMAGE COMPONENTS FOR AN IMAGE CLASSIFIER BY TARGETED MODIFICATION IN THE LATENT SPACE

(71) Applicant: Robert Bosch GmbH, Stuttgart (DE)

(72) Inventor: Andres Mauricio Munoz Delgado, Weil der Stadt (DE)

(73) Assignee: Robert Bosch GmbH, Stuttgart (DE)

(*) Notice: Subject to any disclaimer, the term of this patent is extended or adjusted under 35 U.S.C. 154(b) by 447 days.

(21) Appl. No.: 17/643,481

(22) Filed: Dec. 9, 2021

(65) Prior Publication Data

US 2022/0189148 A1 Jun. 16, 2022

(30) Foreign Application Priority Data

Dec. 14, 2020 (EP) .................................... 20213726

(51) Int. Cl.
*G06V 20/58* (2022.01)
*G06T 7/00* (2017.01)
(Continued)

(52) U.S. Cl.
CPC .......... *G06V 10/776* (2022.01); *G06T 7/0004* (2013.01); *G06V 10/764* (2022.01); *G06V 20/58* (2022.01); *G06T 2207/30252* (2013.01)

(58) Field of Classification Search
CPC .............................. G06V 20/58; G06V 10/776
See application file for complete search history.

(56) References Cited

U.S. PATENT DOCUMENTS

2018/0005448 A1* 1/2018 Choukroun ............... G06T 5/50

FOREIGN PATENT DOCUMENTS

WO 2018197074 A1 11/2018

OTHER PUBLICATIONS

Juan Hernandez "Making AI Interpretable with Generative Adversarial Networks" Apr. 4, 2018. Square Corner Blog, https://medium.com/square-corner-blog/making-ai-interpretable-with-generative-adversarial-networks-766abc953edf. 12 Pages.
(Continued)

*Primary Examiner* — Sam Bhattacharya
(74) *Attorney, Agent, or Firm* — Norton Rose Fulbright US LLP; Gerard A. Messina

(57) ABSTRACT

A method for measuring components of an input image on which an image classifier bases its decision regarding the assignment of the input image to class(es) of a predefined classification. The method includes: processing the input image by the image classifier into an intermediate product; mapping the intermediate product on a classification score with respect to at least one target class; ascertaining a perturbation from counter image(s) which is/are preferentially assigned by the image classifier to at least one class other than the target class; providing at least one binary mask; creating at least one modification, in which pixels established by the binary mask are replaced with pixels of the perturbation corresponding thereto; mapping the modification on a classification score with respect to a predefined class; and ascertaining from the classification score to what extent the binary mask indicates the sought-after decision-relevant components of the input image.

16 Claims, 3 Drawing Sheets

(51) Int. Cl.
*G06V 10/764* (2022.01)
*G06V 10/776* (2022.01)

(56) References Cited

OTHER PUBLICATIONS

Lykas Hoyer et al. "Grid Saliency for Context Explanations of Semantic Segmentation" 3rd Conference on Neural Information Processing Systems, 2019, Vancouver, Canada. arXiv:1907.13054v2. 27 Pages.

* cited by examiner

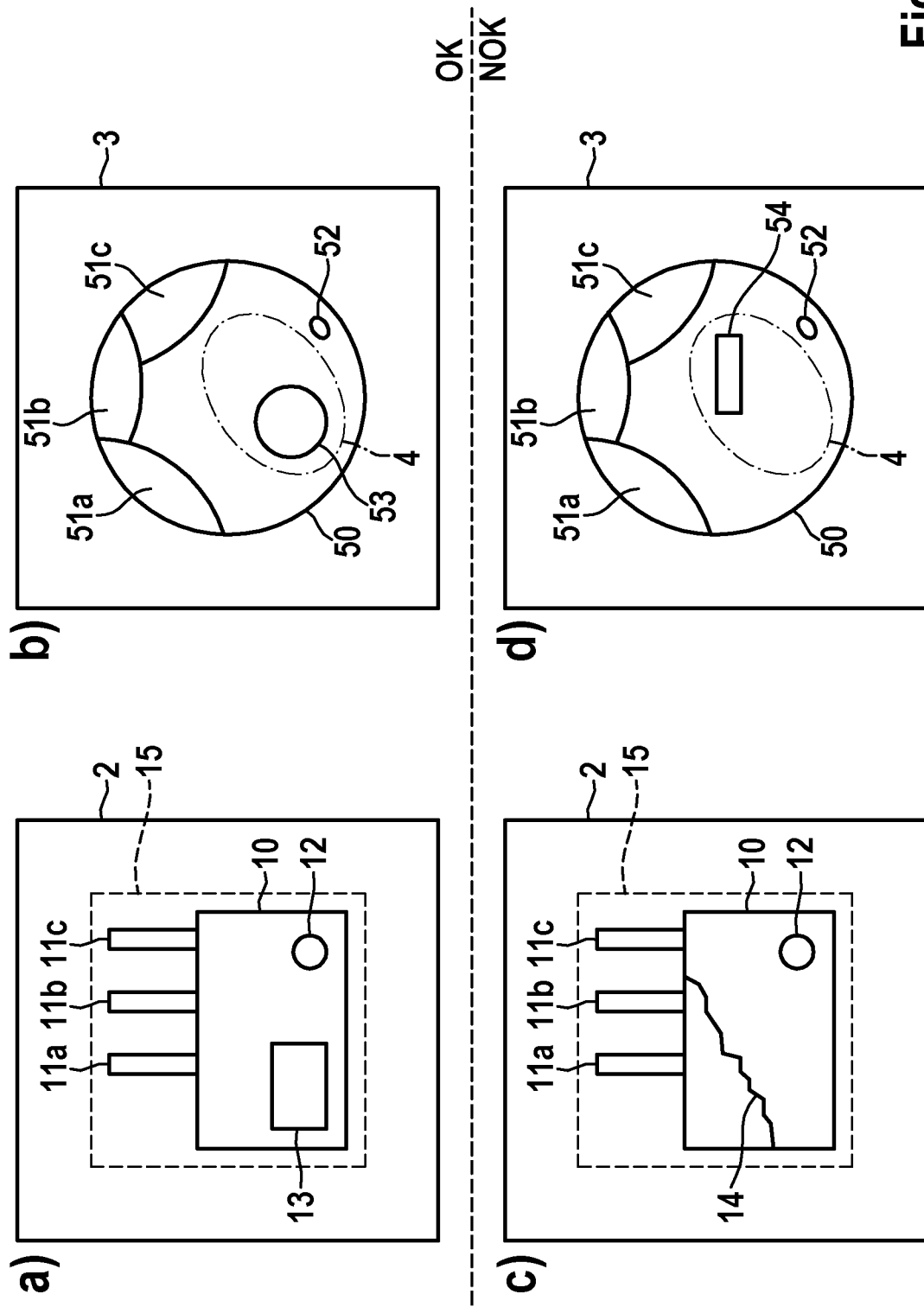

DETERMINATION OF THE DECISION-RELEVANT IMAGE COMPONENTS FOR AN IMAGE CLASSIFIER BY TARGETED MODIFICATION IN THE LATENT SPACE

FIELD

The present invention relates to the check of the behavior of trainable image classifiers which may be used, for example, for the quality control of series-manufactured products or also for the at least semi-automated driving of vehicles.

BACKGROUND INFORMATION

During the series manufacture of products, it is generally necessary to continuously check the quality of the manufacture. In the process, it is sought to detect quality problems as quickly as possible to be able to eliminate the cause as soon as possible and not lose too many units of the particular product as scrap.

The visual inspection of the geometry and/or surface of a product is fast and non-destructive. PCT Patent Application No. WO 2018/197 074 A1 describes a testing device in which an object may be exposed to a plurality of illumination situations, images of the object being recorded with the aid of a camera in each of these illumination situations. From these images, the topography of the object is evaluated.

Images of the product may also be directly assigned to one of multiple classes of a predefined classification based on artificial neural networks using an image classifier. Based thereon, the product may be assigned to one of multiple predefined quality classes. In the simplest case, this classification is binary ("OK"/"not OK").

Trainable image classifiers are also used during the at least semi-automated driving of vehicles to assess traffic situations or at least analyze them for their content of objects.

SUMMARY

Within the scope of the present invention, a method is provided for measuring the components of an input image on which an image classifier bases its decision about the assignment of this input image to one or multiple class(es) of a predefined classification.

In accordance with an example embodiment of the present invention, in this method, the input image is initially processed by the image classifier into an intermediate product using one or multiple convolutional layer(s). This intermediate product is considerably reduced in dimensionality compared to the input image and indicates activations of features which the convolutional layers previously recognized successively in the input image. The more convolutional layers participated in the creation of the intermediate product, the more complex are the features whose activations the intermediate product indicates. For example, the intermediate product may encompass a plurality of feature maps, which were each generated by the application of filter cores to the input image or to an intermediate product that was previously generated from the input image.

The intermediate product thus belongs to a "latent space" within the image classifier. It is mapped by the image classifier on a classification score with respect to at least one target class.

A perturbation in the space of the intermediate products is ascertained from one or multiple counter image(s) which is/are preferentially assigned by the image classifier to at least one class other than the target class. Now, at least one binary mask is provided, which has the same number of pixels as the intermediate product. Each of these pixels in the mask may only assume two different values, i.e., for example 0 and 1 or "True" and "False."

At least one modification is created from the intermediate product. In this modification, pixels established by the binary mask are replaced with pixels of the perturbation corresponding thereto. For example, all pixels which have the value 0 or "False" in the mask may be replaced with pixels of the perturbation.

The modification is mapped by the image classifier on a classification score with respect to a predefined class. From this classification score, it is ascertained, using a quality function, to what extent the binary mask indicates the sought-after decision-relevant components of the input image. By suitably selecting the class to which the classification score of the modification relates and the quality function, it is possible to analyze different aspects of the decision-relevant components of the input image.

If, for example, the predefined class for which the classification score is ascertained from the modification is the target class, the quality function may include a comparison of this classification score to the classification score ascertained for the intermediate product. It is now possible to provide masks, for example, which leave a certain small area of the intermediate product unchanged, while the intermediate product otherwise is subjected to the perturbation. In this way, it is then possible, for example, to analyze whether the unchanged area is so crucial for the assignment of the intermediate product to the target class that the application of the perturbation in the remaining areas of the intermediate product is no longer able to upset this assignment.

However, it is also possible, for example, to deliberately ask with what changes of the intermediate product it is possible to switch the assignment of the intermediate product from the target class to another class. If, for example, an image of a product which was recorded within the scope of quality control of the product was classified in the class "not OK=NOK," it is possible to ask, using corresponding masks, what has to be changed in terms of this image for it to be classified in the class "OK." Ideally, these decision-relevant areas of the image should correspond to specific defects or damage. This is similar to the expectation of a human inspector to name a specific reason for scrapping the product, and not simply asserting that he/she "somehow did not like it."

When the predefined class is not the target class, it may, in particular, be analyzed, for example, with what changes of the intermediate product it is possible to switch the assignment of the intermediate product from the target class to a certain one of multiple possible other classes. In the context of the particular application, erroneous assignments to different classes may have consequences of varying severity. When, for example, a system for the at least semi-automated driving of vehicles classifies traffic signs, the incorrect identification of a "30 km/h" sign as a "50 km/h" sign is less severe than the incorrect identification of the same "30 km/h" sign as sign 301 which grants the right of way for the next intersection or junction. When the vehicle erroneously believes it has the right of way, the risk of collisions is considerably increased.

During these and other analyses, it is of particular advantage that the perturbation is ascertained from one or multiple counter image(s). It was found that the potency of particularly this kind of perturbation is less dependent on the specifics of the model used specifically in the image classifier than is the case for customarily used perturbations. One and the same modification may quite possibly be assigned to different classes by two different image classifiers. Nonetheless, the results achieved for these different image classifiers are meaningfully quantitatively comparable to one another. In this way, for example, the analysis as to which areas are in each case decision-relevant for different image classifiers may supply a criterion for the selection of one of multiple possible image classifiers.

Simpler perturbations, such as the setting of pixels to zero in image classifiers which use a ReLU activation function or the setting of pixels to another uniform value, in contrast, are model-dependent in terms of their potency. For example, the classification of a product into the class "not OK=NOK" may be prompted not only by the presence of defects or damage manifesting in images as additive features. The presence of such features in the images manifests in activations different from zero in the intermediate product, so that the setting to zero of these activations removes the corresponding features. However, it is also possible, conversely, for the absence of certain features to be the reason for classifying the product as "NOK." For example, the manufacturing process of a router for home use may provide that the device is provided with a sticker which contains the password to be used for the initial set-up. During the final inspection, it is then important that this sticker is actually situated on the device since the device is not usable without it. Thus, when the activation of the feature "sticker" is set to zero during the application of a perturbation to the intermediate product, information is not removed, as intended, from the intermediate product, but on the contrary, very important information about a defect of the product is added.

Advantageously, an intermediate product is selected which is mapped on the at least one classification score in the image classifier by a classifier layer. In particular, in the case of such intermediate products, the effect that the setting of activations to zero or another uniform value has is model-dependent in the described manner.

The perturbation may, in particular, be formed from at least one intermediate product, into which the image classifier processes one or multiple counter images. In the modification of the intermediate product, this may result both in the activation of additional features and in the deactivation of features. For example, the perturbation may, in particular, be formed by averaging or forming another summarizing statistic over multiple intermediate products to which the image classifier processes different counter images.

In one further advantageous embodiment of the present invention, at least one counter image is selected from multiple counter images, for which the intermediate product formed by the image classifier comes closest to the intermediate product formed of the input image in accordance with a predefined distance dimension. For example, the cosine distance between vectors which include the pixel values of the particular intermediate products may be used as the distance dimension. The perturbation is then more realistic and includes fewer semantic errors, such as for example objects which float freely in the air after the table on which they were previously situated has been removed.

In one further particularly advantageous embodiment of the present invention, a plurality of binary masks is provided. The sought-after decision-relevant components of the input image are ascertained from the entirety of the masks and associated assessments by the quality function. This may include, for example, assigning an assessment number, which indicates how decision-relevant this specific pixel is, to each pixel of the input image. The plurality of binary masks may, for example, be drawn from a random distribution, for example a Bernoulli distribution.

With this procedure, even binary masks having modest or poor assessments by the quality function do not simply have to be discarded. Instead, all examined masks in total may be incorporated into the final result which is ultimately formed. Finally, the aggregation across a number of randomly drawn binary masks also causes a portion of the randomness in the masks to be averaged out again.

Advantageously, at least one counter image is randomly selected for the assessment of each mask. This renders the ultimately aggregated result independent from the selection of certain counter images.

In one further particularly advantageous embodiment of the present invention, a decision-relevant component of the input image is evaluated from a sum of binary masks, which are in each case weighted with the assessments of these binary masks by the quality function.

It shall be assumed, for example, that x is an input image, and $f_L(x)$ is an intermediate product generated therefrom by the image classifier in the latent space. A modification $x'_L$ of this intermediate product may then, for example, be written in the latent space using a binary mask m and a perturbation $P_L(x)$ established based on input image x, as $$x_L'=f_L(x)\odot m+P_L(x)\odot(1-m).$$

Quality assessment $R_{x,f}(m)$ of each mask m may now correspond to classification score $f_c$, for example, which the image classifier assigns to this modification $x'_L$:

$$R_{x,f}(m)=f_c(x_L').$$

When N binary masks mi are drawn in the space of the intermediate products, an assessment number S(X) may, for example, be written as $$S_{x,f}(\lambda) \approx \frac{1}{E[m]\cdot N}\sum_{i=1}^{N}R_{x,f}(m_i)\cdot m_i(\lambda).$$

Herein, index f denotes the image classifier.

In general, a decision-relevant component of the intermediate product ascertained from one or multiple binary mask(s) may be transferred into the sought-after decision-relevant component of the input image by interpolation or other upsampling. In the process, the spatial correspondence between the intermediate product and the input image is utilized.

In one particularly advantageous embodiment of the present invention, an image of a series-manufactured product is selected as the input image. The classes of the classification then represent a quality assessment of the product, such as for example "OK," "not OK=NOK," "no decision possible" or also arbitrary levels therebetween. In this connection, in particular, declarations as to why the image classifier assigns an input image to class "NOK" are important. Here, images which are assigned by the image classifier to the class "OK" are utilized as counter images. During the series manufacture of products, all images, i.e., both the "OK" images and the "NOK" images are generally very similar to one another since the manufacturing process normally supplies very reproducible results. Accordingly, the activations in the intermediate products obtained from these images are also very similar to one another. The method described here supplies very specific declarations of the differences between "OK" images and "NOK" images.

Using such declarations, it is not only possible to improve the image classifier itself, but it is also possible to gain findings about the potential cause of the quality problem, which was set during the manufacturing process. If, for example, a plurality of small localized defects at the product were decisive for the classification as "NOK" and these defects, in turn, are correlated with certain physical conditions during the manufacture of the product (such as for example a high temperature or high pressure), it is possible to deliberately work toward correcting these conditions so that, in the future, a larger percentage of the manufactured product specimens is classified as "OK."

The ascertained components of the input images on which the image classifier bases its decision may, in particular, be compared, for example, to a component of the input image which was ascertained to be relevant for the quality assessment of the product based on an observation of the same product using a different mapping modality. From the result of this comparison, it is then possible to ascertain a quality assessment for the image classifier. For example, hyperparameters of the image classifier may be optimized, with the goal of optimizing this quality assessment.

In one further particularly advantageous embodiment of the present invention, an image of a traffic situation recorded from a vehicle is selected as the input image. The classes of the classification then represent assessments of the traffic situation, on the basis of which the future behavior of the vehicle is planned. In particular, in this field of application, the image classifier and a downstream warning system, driver assistance system or system for at least semi-automatic driving may frequently only be trusted on the condition that the decisions of the image classifier are explainable. The method is able to supply precisely these explanations.

For example, a recognition system for pedestrians may detect whether the traffic situation in the input image includes a pedestrian (output 1) or whether this traffic situation does not include a pedestrian (output 0). If, according to the image classifier, an input image, for example, does not include a pedestrian, it is possible to add "pedestrian activations" to the intermediate product created from this input image in various locations to study how the behavior of the image classifier changes.

In this connection, it is particularly advantageous that the modifications are generated by changes of the intermediate product and not by changes of the input image itself. It is considerably simpler to insert a "pedestrian activation" in the latent space of the intermediate products than to generate a modification which includes an additional pedestrian and still looks realistic by the pixelwise change of the input image. The method described here is thus generally a simpler way to test new data points which were generated using a generative adversarial network (GAN) or another generative model.

The ascertained components of the input images on which the image classifier bases its decision may, in particular, be compared, for example, to a component of the input image which is known to be relevant for the assessment of the traffic situation. From the result of this comparison, it is then possible to ascertain a quality assessment for the image classifier. Similarly to the application example of the quality control of series-manufactured products, it is then possible, for example, to optimize hyperparameters of the image classifier, with the goal of thereafter better assessing the quality of the image classifier.

The methods may, in particular, be entirely or partially computer-implemented. The present invention thus also relates to a computer program including machine-readable instructions which, when they are executed on one or multiple computer(s), prompt the computer(s) to carry out one of the described methods. Within this meaning, control units for vehicles and embedded systems for technical devices, which are also able to execute machine-readable instructions, are to be regarded as computers.

The present invention also relates to a machine-readable data medium and/or to a download product including the computer program. A download product is a digital product transmittable via a data network, i.e., downloadable by a user of the data network, which may be offered for immediate download in an online shop, for example.

Furthermore, in accordance with an example embodiment of the present invention, a computer may be equipped with the computer program, with the machine-readable data medium and/or with the download product.

Further measures improving the present invention are shown hereafter in greater detail together with the description of the preferred exemplary embodiments of the present invention based on the figures.

BRIEF DESCRIPTION OF THE DRAWINGS

FIG. 2 shows an illustration of the problem that the deactivation of features may also add information in the latent space.

DETAILED DESCRIPTION OF EXAMPLE EMBODIMENTS

Figure 1A:
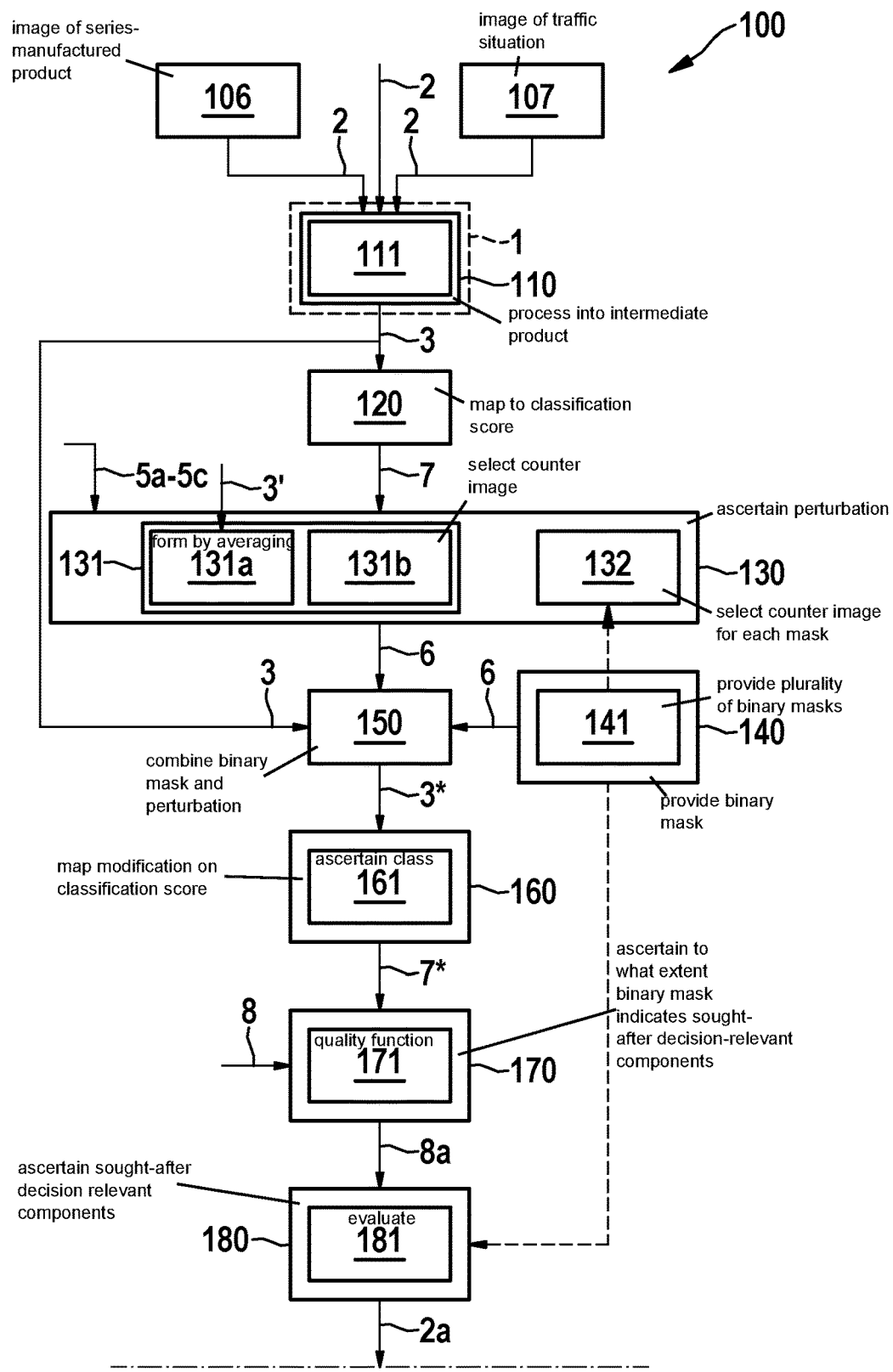
FIGS. 1A and 1B show an exemplary embodiment of method 100 for measuring decision-relevant components 2a of an input image 2.
Figure 1B:
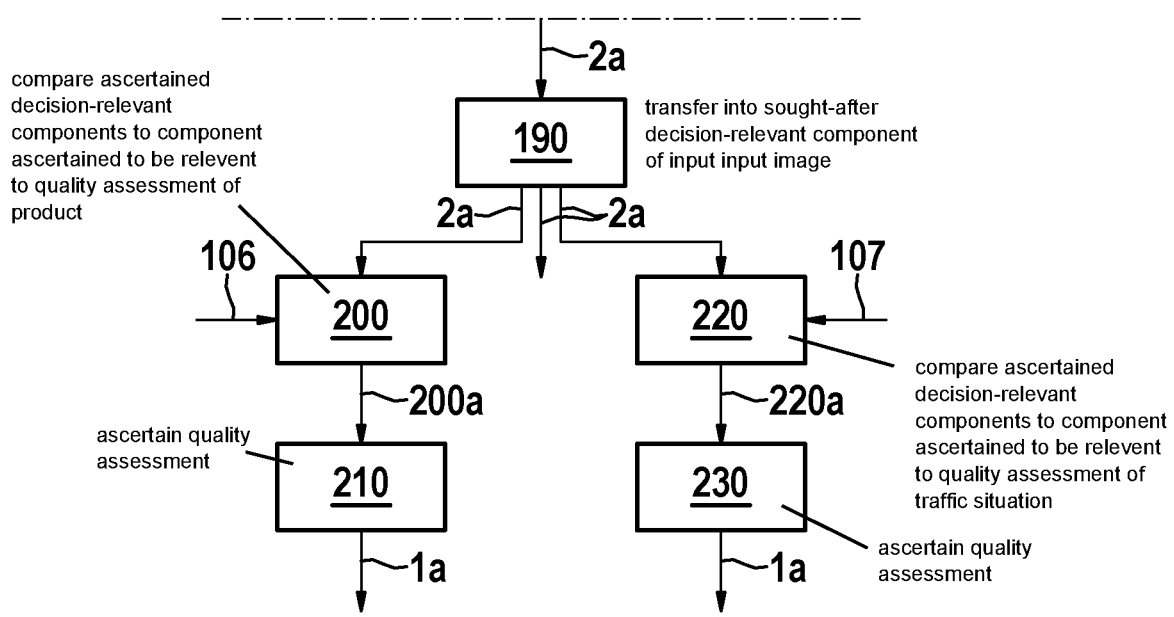

FIGS. 1A and 1B are, together, a schematic flowchart of an exemplary embodiment of method 100 for measuring components 2a of an input image 2 on which an image classifier 1 bases its decision regarding the assignment of this input image 2 to one or multiple class(es) of a predefined classification. According to block 106, input image 2 may optionally be an image of a series-manufactured product or, according to block 107, an image of a traffic situation.

In step 110, input image 2 is processed by image classifier 1 into an intermediate product 3 using one or multiple convolutional layer(s). According to block 111, an intermediate product 3 may advantageously be selected which is mapped on the at least one classification score 7 in image classifier 1 by a classifier layer. Intermediate product 3 may, in particular, not be processed by any further convolutional layer, for example, until processed by the classifier layer.

In step 120, intermediate product 3 is mapped by image classifier 1 on a classification score 7 with respect to at least one target class.

In step 130, a perturbation 6 in the space of intermediate products 3 is ascertained from one or multiple counter image(s) 5a through 5c which is/are preferentially assigned by image classifier 1 to at least one class other than the target class.

In step 140, at least one binary mask 4 is provided, which has the same number of pixels as intermediate product 3. Binary mask 4 and perturbation 6 are combined in step 150: From intermediate product 3, at least one modification 3* is created, in which pixels established by binary mask 4 are replaced with pixels of perturbation 6 corresponding thereto.

In the process, according to block 131, for example, perturbation 6 may, in particular, be formed from at least one intermediate product 3' into which image classifier 1 processes one or multiple counter images 5a through 5c.

For example, according to block 131a, perturbation 6 may be formed by averaging or forming another summarizing statistic over multiple intermediate products 3' to which image classifier 1 processes different counter images 5a through 5c.

According to block 131b, for example, at least one counter image 5a through 5c may be selected from multiple counter images 5a through 5c, for which intermediate product 3' formed by image classifier 1 comes closest to intermediate product 3 formed of input image 2 in accordance with a predefined distance dimension.

If multiple masks 4 are used, it is possible, according to block 132, to randomly select at least one counter image 5a through 5c for the assessment of each mask 4, so that the ultimately obtained result is not too heavily tied to individual counter images 5a through 5c.

In step 160, modification 3* is mapped by image classifier 1 on a classification score 7* with respect to a predefined class. In step 170, it is ascertained from this classification score 7*, using a quality function 8, to what extent 8a binary mask 4 indicates the sought-after decision-relevant components 2a of input image 2. Extent 8a is thus the value of quality function 8 for the specific binary mask 4.

According to block 161, the predefined class for which classification score 7* is ascertained from modification 3* may, in particular, be the target class, for example. According to block 171, quality function 8 may then include a comparison of this classification score 7* to classification score 7 ascertained for intermediate product 3.

According to block 141, a plurality of binary masks 4 may be provided. The sought-after decision-relevant components 2a of input image 2 may then be ascertained in step 180 from the entirety of masks 4 and associated assessments 8a by quality function 8.

If the decision-relevant component was previously ascertained in the space of the intermediate product, it may be transferred in step 190 into the sought-after decision-relevant component 2a of input image 2 by interpolation or other upsampling.

To the extent that decision-relevant components 2a according to block 106 were ascertained based on an input image 2 which shows a series-manufactured product, these components 2a may be compared, in step 200, to a component 2b of the input image which was ascertained to be relevant for the quality assessment of the product based on an observation of the same product using a different mapping modality. From result 200a of this comparison 200, it is then possible, in step 210, to ascertain a quality assessment 1a for image classifier 1.

To the extent that decision-relevant components 2a according to block 107 were ascertained based on an input image 2 which shows a traffic situation, these components 2a may be compared, in step 220, to a component 2b of the input image which is known to be relevant for the assessment of the traffic situation. From result 220a of this comparison 220, it is then possible, in step 230, to ascertain a quality assessment 1a for image classifier 1.

FIG. 2 illustrates the relationship between image features which are relevant for the quality assessment of a product, and activations of features in an intermediate product 3, obtained from input image 2, in the latent space.

Subimage a) is an input image 2, which shows a WLAN router 15 for home use. During an external visual inspection of router 15, a housing 10, three antennas 11a through 11c, an LED 12 and a sticker 13 including the password for the initial start-up are normally visible. All these components are also actually present in subimage a), so that an image classifier 1 used for the quality control should sort this input image 2 into class "OK." Subimage b) shows intermediate product 3, obtained on the way to this assessment, in the latent space. Activations 50, 51a through 51c, 52 and 53 correspond to image features 10, 11a through 11c, 12 and 13.

Subimage c) is an input image 2, which shows a router 15 which is defective for two reasons. On the one hand, housing 10 has a large crack 14. On the other hand, sticker 13 is missing, without which the initial start-up is not possible, and the entire router 15 is useless. Each of these defects by itself is reason enough for router 15 to no longer be salable. As a result, this input image 2 is sorted into class "not OK=NOK" by image classifier 1. Subimage d) shows intermediate product 3, which resulted on the way to this assessment, in the latent space. Compared to subimage b), an activation 54 was added here, which corresponds to crack 14 in housing 10. At the same time, activation 53 which corresponds to sticker 13 is missing.

This means that, in intermediate product 3 according to subimage b), the setting to zero of activation 53, which corresponds to sticker 13, not only means a non-critical "resetting" of information to a standard state "no information." Rather, the information that router 15 has a serious defect which prevents the start-up is added in this way.

This effect is even more evident in the inverse situation in which the training of image classifier 1 is converged to the effect that an activation 53 of zero indicates the presence of sticker 13, and an activation 53 different from zero (for example 1) indicates the absence of sticker 13. If an input image 2 of a router 15 including sticker 13 is now to be analyzed as to why this router 15 was classified as "OK," it is not possible, with the aid of the conventional setting to zero of activations, to recognize that sticker 13 has something to do with the quality of router 15. Activation 53 is already zero, i.e., a corresponding perturbation 6 has no impact.

The method described here ascertains perturbation 6 based on counter images 5a through 5c. With this, perturbation 6 changing intermediate product 3 at all is no longer dependent on the coding of individual features in intermediate product 3. Decision-relevant components 2a of input image 2 may only be ascertained using a perturbation 6 which changes intermediate product 3.

An exemplary mask 4 is plotted in subimages b) and d), which delimits a potential decision-relevant area in intermediate product 3. Perturbation 6 used within the scope of method 100 may include, for example, copying the area labeled according to mask 4 from an intermediate product 3 belonging to a counter image 5a through 5c into modification 3* formed from present intermediate product 3.

What is claimed is:

1. A method for measuring components of an input image on which an image classifier bases its decision regarding an assignment of the input image to one or multiple classes of a predefined classification, the method comprising the following steps:
   processing the input image by the image classifier into an intermediate product using one or multiple convolutional layers;
   mapping the intermediate product by the image classifier on a classification score with respect to at least one target class;

ascertaining a perturbation in a space of the intermediate product from one or multiple counter images which is preferentially assigned by the image classifier to at least one class other than the target class;

providing at least one binary mask, which has the same number of pixels as the intermediate product;

creating, from the intermediate product, at least one modification, in which pixels of the intermediate product established by the binary mask are replaced with pixels of the perturbation corresponding the pixels established by the binary mask;

mapping the modification by the image classifier on a classification score with respect to a predefined class; and ascertaining from the classification score, using a quality function, to what extent the binary mask indicates sought-after decision-relevant components of the input image.

2. The method as recited in claim 1, wherein the intermediate product is selected which is mapped on the at least one classification score in the image classifier by a classifier layer.

3. The method as recited in claim 1, wherein the perturbation is formed of at least one intermediate product to which the image classifier processes the one or multiple counter images.

4. The method as recited in claim 3, wherein the perturbation is formed by averaging or forming another summarizing statistic over multiple intermediate products into which the image classifier processes different counter images.

5. The method as recited in claim 3, wherein at least one counter image is selected from the one or multiple counter images, for which an intermediate product formed by the image classifier comes closest to the intermediate product formed of the input image in accordance with a predefined distance dimension.

6. The method as recited in claim 1, wherein the at least one binary mask includes a plurality of binary masks, and the sought-after decision-relevant components of the input image are ascertained from all of the plurality of binary masks and associated assessments by the quality function.

7. The method as recited in claim 6, wherein at least one counter image of the one or multiple counter images is randomly selected for the assessment of each of the binary masks.

8. The method as recited in claim 6, wherein each decision-relevant component of the input image is evaluated from a sum of the binary masks, which are each weighted with the assessments of these binary masks by the quality function.

9. The method as recited in claim 1, wherein the predefined class for which the classification score is ascertained from the modification is the target class, the quality function including comparison of the classification score to a classification score ascertained for the intermediate product.

10. The method as recited in claim 1, wherein each decision-relevant component of the intermediate product ascertained from the one or multiple binary masks is transferred into the sought-after decision-relevant component of the input image by interpolation or other upsampling.

11. The method as recited in claim 1, wherein an image of a series-manufactured product is selected as the input image, and the classes of the classification represent a quality assessment of the product.

12. The method as recited in claim 11, wherein the ascertained components of the input image on which the image classifier bases its decision are compared to a component of the input image which was ascertained to be relevant for a quality assessment of the product based on an observation of the same product using a different mapping modality, a quality assessment for the image classifier being ascertained from a result of the comparison.

13. The method as recited in claim 1, wherein an image of a traffic situation recorded from a vehicle is selected as the input image, the classes of the classification representing assessments of the traffic situation, based on which a future behavior of the vehicle is planned.

14. The method as recited in claim 13, wherein the ascertained components of the input image on which the image classifier bases its decision are compared to a component of the input image which is known to be relevant for the assessment of the traffic situation, a quality assessment for the image classifier being ascertained from a result of the comparison.

15. A non-transitory machine-readable data medium on which is stored a computer program including machine-readable instructions for measuring components of an input image on which an image classifier bases its decision regarding an assignment of the input image to one or multiple classes of a predefined classification, the machine-readable instructions, when executed by one or more computers, causing the one or more computers to perform the following steps:

processing the input image by the image classifier into an intermediate product using one or multiple convolutional layers;

mapping the intermediate product by the image classifier on a classification score with respect to at least one target class;

ascertaining a perturbation in a space of the intermediate product from one or multiple counter images which is preferentially assigned by the image classifier to at least one class other than the target class;

providing at least one binary mask, which has the same number of pixels as the intermediate product;

creating, from the intermediate product, at least one modification, in which pixels of the intermediate product established by the binary mask are replaced with pixels of the perturbation corresponding the pixels established by the binary mask;

mapping the modification by the image classifier on a classification score with respect to a predefined class; and ascertaining from the classification score, using a quality function, to what extent the binary mask indicates sought-after decision-relevant components of the input image.

16. A computer configured to measure components of an input image on which an image classifier bases its decision regarding an assignment of the input image to one or multiple classes of a predefined classification, the computer configured to:

process the input image by the image classifier into an intermediate product using one or multiple convolutional layers;

map the intermediate product by the image classifier on a classification score with respect to at least one target class;

ascertain a perturbation in a space of the intermediate product from one or multiple counter images which is preferentially assigned by the image classifier to at least one class other than the target class;

provide at least one binary mask, which has the same number of pixels as the intermediate product;

create, from the intermediate product, at least one modification, in which pixels of the intermediate product established by the binary mask are replaced with pixels of the perturbation corresponding the pixels established by the binary mask;

map the modification by the image classifier on a classification score with respect to a predefined class; and ascertain from the classification score, using a quality function, to what extent the binary mask indicates sought-after decision-relevant components of the input image.

\* \* \* \* \*